April 23, 1957 D. B. DOOLITTLE Re. 24,306

JET POWER AIRCRAFT LAUNCHING SYSTEM

Original Filed Dec. 29, 1951 11 Sheets-Sheet 1

INVENTOR

Donald B. Doolittle

BY Herbert M. Birch

ATTORNEY

JET POWER AIRCRAFT LAUNCHING SYSTEM

Original Filed Dec. 29, 1951 11 Sheets-Sheet 2

INVENTOR

Donald B. Doolittle.

BY Herbert M. Birch

ATTORNEY

JET POWER AIRCRAFT LAUNCHING SYSTEM

Original Filed Dec. 29, 1951 11 Sheets-Sheet 3

INVENTOR

BY Donald B. Doolittle.
Herbert M. Birch
ATTORNEY

JET POWER AIRCRAFT LAUNCHING SYSTEM

Original Filed Dec. 29, 1951 11 Sheets-Sheet 4

INVENTOR.

BY Donald B. Doolittle.
Herbert M. Birch
ATTORNEY

JET POWER AIRCRAFT LAUNCHING SYSTEM

Original Filed Dec. 29, 1951 11 Sheets-Sheet 5

INVENTOR

Donald B. Doolittle

BY Herbert M. Birch

ATTORNEY

JET POWER AIRCRAFT LAUNCHING SYSTEM

Original Filed Dec. 29, 1951 11 Sheets-Sheet 6

INVENTOR

Donald B. Doolittle.

BY Herbert M. Birch

ATTORNEY

JET POWER AIRCRAFT LAUNCHING SYSTEM

Original Filed Dec. 29, 1951 11 Sheets-Sheet 7

INVENTOR

Donald B. Doolittle.

BY Herbert M. Birch

ATTORNEY

April 23, 1957 D. B. DOOLITTLE Re. 24,306

JET POWER AIRCRAFT LAUNCHING SYSTEM

Original Filed Dec. 29, 1951 11 Sheets-Sheet 8

INVENTOR

Donald B. Doolittle.

Herbert M. Birch

ATTORNEY

JET POWER AIRCRAFT LAUNCHING SYSTEM

Original Filed Dec. 29, 1951 11 Sheets-Sheet 9

INVENTOR

Donald B. Doolittle.

BY Herbert M. Birch

ATTORNEY

JET POWER AIRCRAFT LAUNCHING SYSTEM

Original Filed Dec. 29, 1951 11 Sheets-Sheet 10

INVENTOR

Donald B. Doolittle.

BY Herbert M. Birch

ATTORNEY

JET POWER AIRCRAFT LAUNCHING SYSTEM

Original Filed Dec. 29, 1951 11 Sheets-Sheet 11

INVENTOR

Donald B. Doolittle.

BY

Herbert M. Birch

ATTORNEY

United States Patent Office

Re. 24,306
Reissued Apr. 23, 1957

24,306

JET POWER AIRCRAFT LAUNCHING SYSTEM

Donald B. Doolittle, Wilmington, Del., assignor, by mesne assignments, to All American Engineering Company, Wilmington, Del., a corporation of Delaware Original No. 2,771,257, dated November 20, 1956, Serial No. 264,170, December 29, 1951. Application for reissue December 14, 1956, Serial No. 629,431

19 Claims. (Cl. 244—63)

Matter enclosed in heavy brackets [ ] appears in the original patent but forms no part of this reissue specification; matter printed in italics indicates the additions made by reissue.

The present invention relates to a jet engine power plant and more particularly to a jet reaction powered rotor with mechanical power take-off connections for driving various mechanisms.

An object of the present invention is to provide a jet reaction powered rotor with tangential exhaust including afterburning means in the turbine exhaust flowing through the rotor tail pipes ahead of the jet expansion nozzle to increase the tangential thrust output of the rotor. For example, thermodynamically, the effect with afterburners is that of a reheat stage in the expansion process. The immediate result is an increase in jet energy approximately proportional to the ratio of the total rotor tail-pipe temperature following afterburning to the total temperature prior to afterburning. The ratio of the jet velocities, with or without afterburning, is accordingly approximately proportional to the square-root of this temperature ratio.

Another object is to provide control members actuated by an operator for reversing the direction of rotor rotation.

Still another object is to provide brake means for holding the rotor fixed and to further provide suitable means for operating the said brake means when the thrust output of the rotor reaches a predetermined value.

A specific object is to provide the novel combination of a jet power system with an aircraft launching apparatus, such as a catapult comprising a catapult cable, and a track and shuttle, which may be a flush deck or above the ground surface type.

Another object is to provide novel means for reciprocal catapult launching, that is alternate launching of aircraft in opposite directions.

Another object is to provide expeditionary launching apparatus, which may be transported and set up for operation in different localities as needed.

With these and other objects in view, the invention consists in the construction, arrangement and combination of parts hereinafter described and particularly summarized in the appended claims, it being expressly understood that there is no intent to limit the invention to the details of construction.

In the drawings like parts throughout the several views are given like numerals and are thus identified in the following detailed description:

Figure 1:
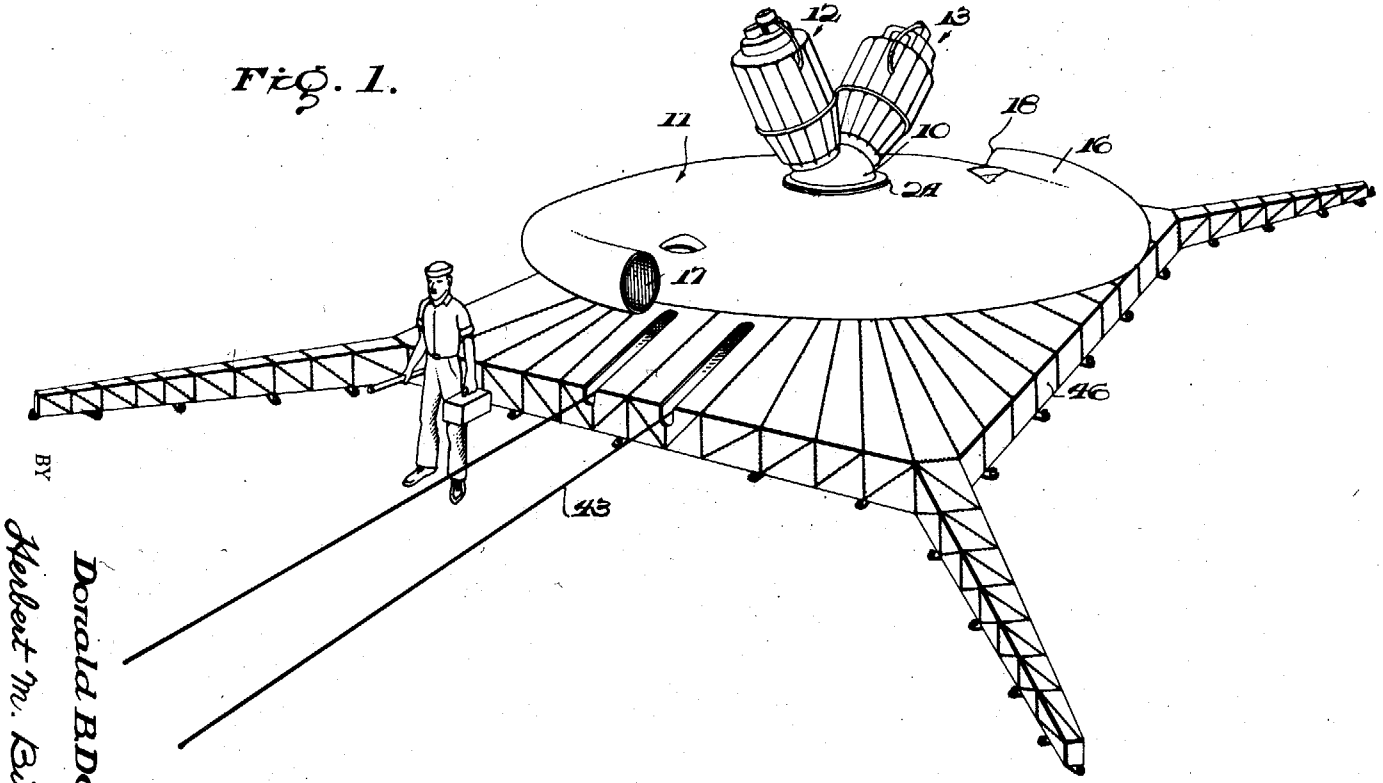
Figure 1 is a general exterior perspective view of one embodiment of the invention showing the turbine-compressor units mounted on a supporting structure at the center of the jet rotor casing and a lower housing for the cable sheave and associated power take-off cable connections.
Figure 2:
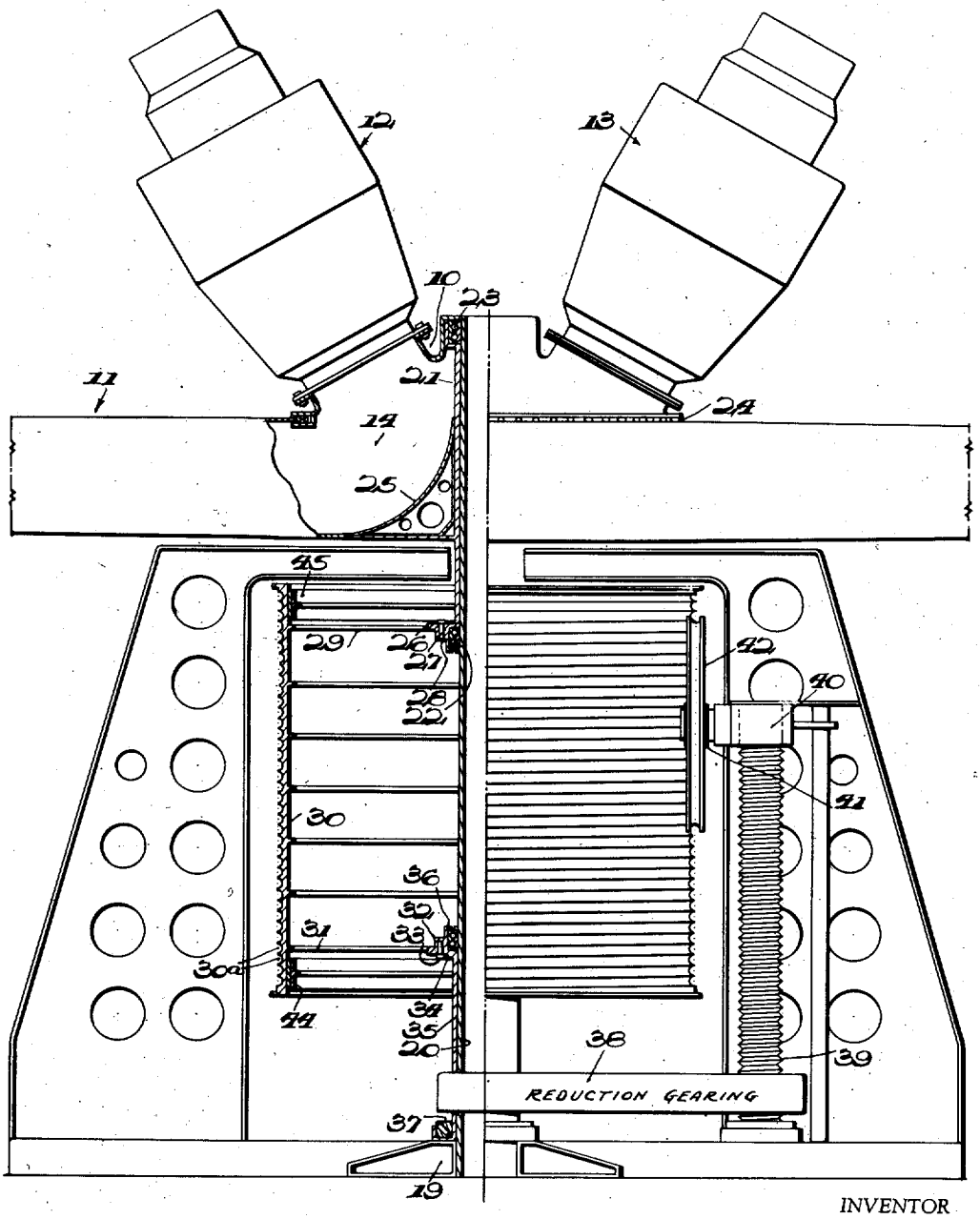
Figure 2 is a front view of Figure 1 part in elevation and part in cross section, showing the driven sheave, the gear driven cable follower pulley and cable lead out sheave.
Figure 3:
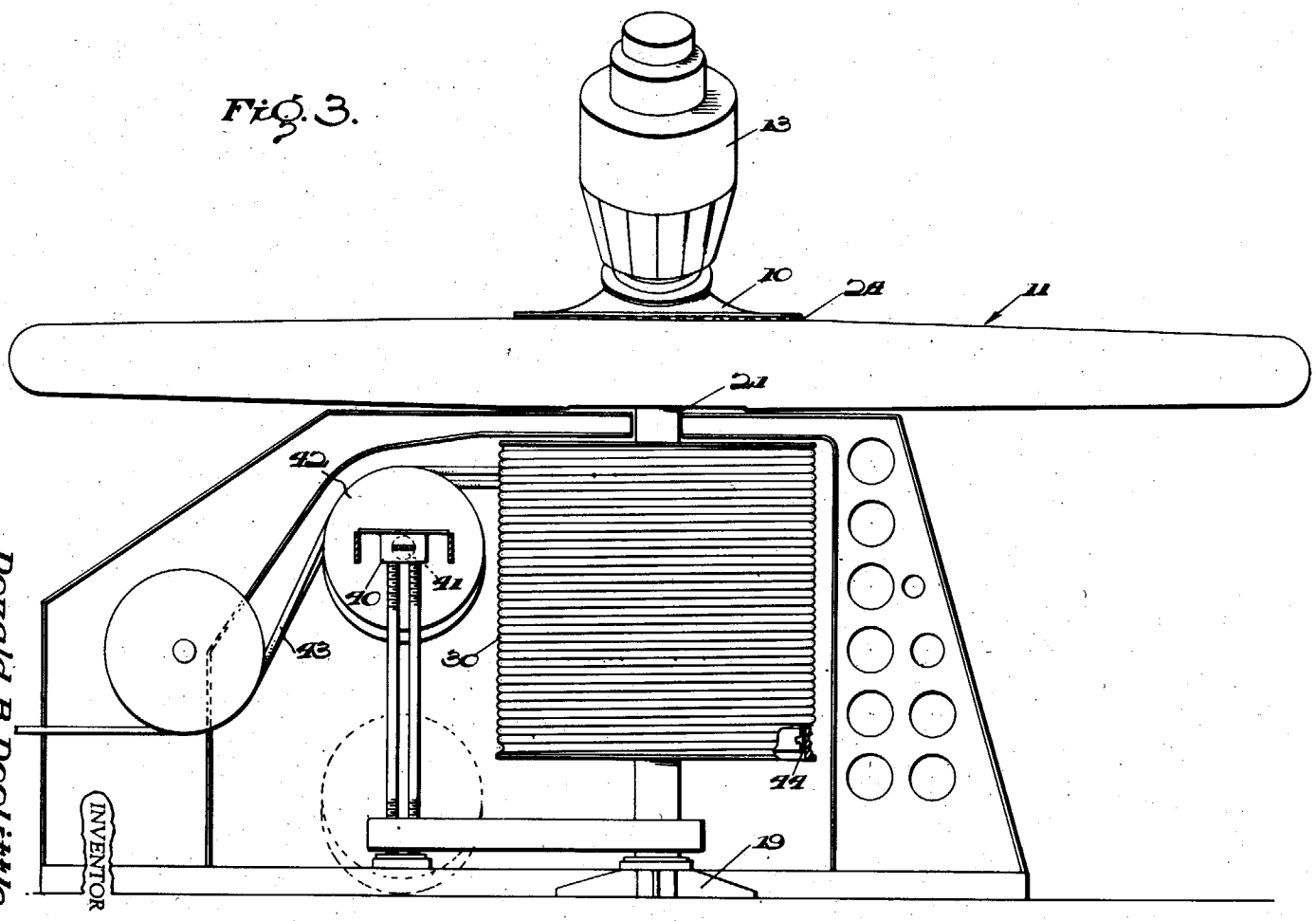
Figure 3 is a side view part in elevation and part in cross section at the lower edge of the drive sheave to show a brake drum and showing the gear driven follower pulley in its lower position after a forward launching operation of the shuttle, not shown.

Referring in detail to Figure 1, there is illustrated one proposed catapult typical installation of one embodiment of the present invention jet power plant shown in Figures 2 and 3. Mounted upon a fixed hollow dome 10 in the center of the rotor casing 11 are turbine compressor units 12 and 13, respectively, of any suitable known type, such as the Brown-Boveri design or the A. Lysholm design. The exhaust of these units is directed from the dome 10 into the hollow hub 14 of the rotor 11, which rotor includes an S-shaped tail pipe 16 divided at the center thereof by said hollow unit 14 into curved tail pipe sections. Each curved tail pipe section includes a reaction nozzle 17 and 18 opening tangentially of the rotor circumference to the atmosphere in a counter-clockwise direction. The exhaust from the power units flows from these reaction nozzles tangentially from the otherwise closed body of the rotor 11 and provides thrust to drive the rotor in a clockwise direction. Afterburners, not shown in Figures 1, 2 and 3, may be installed in the wall of each outlet curve of the tail-pipe sections in the expansion area ahead of each of the jet expansion nozzles 17 and 18 to increase the thrust output of the rotor jets.

Centrally extending from a base 19 (see Figures 2 and 3), is a fixed vertical shaft 20 formed at its upper end with the fixed hollow dome 10. This dome is formed with flanged openings to mount the flanged base of the jet power units 12 and 13, which exhaust into the hollow hub 14 of the jet reaction rotor casing 11. The rotor 11 is journalled by bearing sleeve 21 and roller bearings 22 and 23, so as to be rotatable on said vertical rotor axis shaft 20 and also journalled for rotation by a large annular bearing race 24 between the outer circumference of the dome 10 and the peripheral top edge of the hollow hub 14 of the rotor.

The hub 14 is reinforced and braced from the closed bottom of the rotor casing 11 around the bearing sleeve 21 by several annularly spaced brackets 25, which are fixed to the said sleeve.

The rotor bearing sleeve 21 extends downward through the hub part 14 of the rotor and is formed on the end into a flange 26 with openings to receive securing bolts 27. These bolts thread into threaded sockets formed in an annulus 28 formed in a plate 29 mounted within the end of a cable winding drum 30. The opposite lower end of the drum 30 is formed with a similar plate 31 and socketed annulus 32 and is similarly connected by bolts 33 to a flange 34 of a bearing sleeve 35 journalled by bearings 36 and 37. Thus when the rotor 11 is rotated the connection of the sleeve flange 26 to the head plate 29 of the drum 30 causes the drum 30 to also revolve around the vertical axle or shaft 20.

The lower sleeve 35 secured by flange 34 and bolts 33 at its lower end above the bearing 37 includes a power take-off reduction gear train in a casing 38. This reduction gear train drives a vertical follower screw shaft 39, which extends upward longitudinally in spaced relation to the outer circumference of the drum 30. The drum is formed with a continuous groove 30[a] of a helical pitch. Travelling up and down the follower screw 39 is a threaded follower block 40 with a stub shaft 41 on which rotates a follower pulley 42 for an endless cable 43 (see Figures 1 and 3). The cable 43 is driven by rotation of the drum 30 after rotor thrust has developed sufficient to catapult a shuttle towed aircraft and the drum's friction brakes 44 and 45 are released. Since jet engines are essentially constant thrust devices, they are very adaptable to use as catapulting engines. The ability of the jet engines 12 and 13 to maintain thrust with the rotor 11 stalled allows this type of catapult to operate without clutches or other slipping friction devices. This serves to make the catapult performance highly reliable and consistent.

The drum, supporting base and driving connections below the rotor are housed in a reinforced housing 46 which travels the respective reaches of the cable 43.

Figure 4:
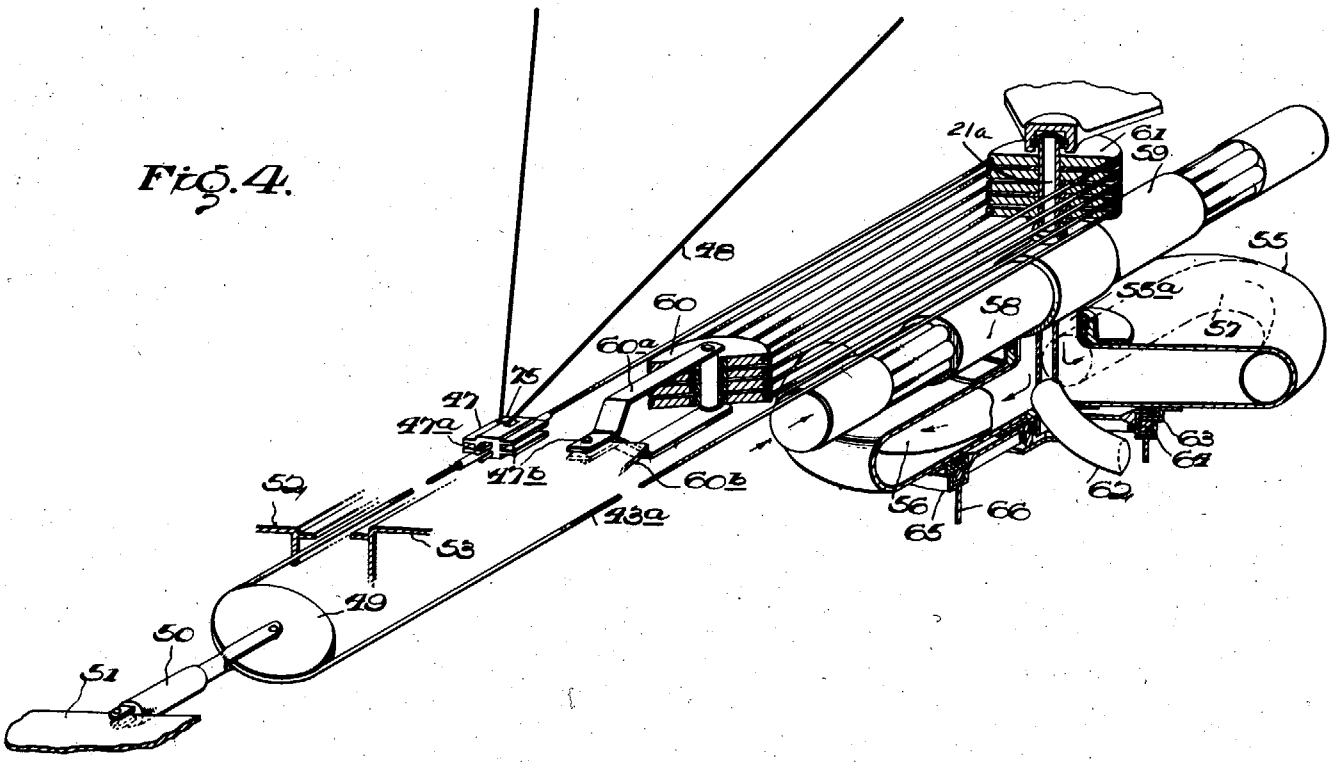
Figure 4 is illustrative of a second embodiment of the present invention jet power plant in diagrammatic perspective form with the rotor connected to the exhausts of a pair of aligned turbo-compressor units, said rotor having the forward launching catapult exhaust ports or nozzles and braking and retrieving ports or nozzles opening to reverse directions to the said forward launching ports.

The catapult elements of course include the usual cable shuttle 47 for connection to the aircraft tow bridle 48 with the cable looped around a sheave 49 suitably anchored to a fluid type tensioning cylinder 50 connected at one end to a solid surface 51 (see Figure 4). This cylinder 50 maintains the cable tension for best performance.

This figure is a second embodiment of the invention showing a flush installation with a deck or ground surface including track sections 52 and 53 and another arrangement of the jet motor and drive pulley for a catapult cable 43[a]. For example, the rotor 55 may be confined in a pit below surface and thrust is developed in the thermal jet curved tail pipes 56 and 57 by exhausting turbo-jet engines 58 and 59 into the rotor hub 55[a] and said tail pipes. Each tail pipe preferably includes an afterburner and is arranged to direct the exhaust tangential to the rotor. This tangential exhaust will develop the necessary torque to drive the cable 43[a] through a friction sheave drive arrangement comprising sheaves 60 and 61. The radius of action of the rotor jet nozzles is several times the drive pulley radius so that the jets operate at an efficient speed for this type of propulsion. Sheave 61 is mounted on an axle 21[a], which rotates with the rotor and sheave 60 is turnable in a yoke 60[a] on a floating axle with the yoke anchored to a fixed part 60[b].

The rotor 55 also has reverse action braking and shuttle retrieving exhaust tail pipes 62 tangentially exhausting reversely with respect to the tail pipes 56 and 57. Also, the rotor casing at the bottom exterior surface is formed with an annular brake drum 63 and engageable therewith is the annular brake shoe 64 in a fluid tight housing 65 connection by conduits 66 to a fluid supply source.

Catapult operation

Briefly, in operating this catapult the turbo-jet engines are brought to the necessary power output with the rotor 55 held by the brake. The afterburner, not shown, is then started and when the thrust reaches a predetermined required value, the brake is released and the catapult is made by the forward drive of the shuttle 47 along the track sections toward the terminal end [49 and] cable tensioning sheave 49.

The aircraft is towed by bridle 48 looped to shuttle hook 75. The cable attached to the drum is driven by the friction sheave drive and pulls the shuttle along the track, in turn the shuttle pulls the airplane, thus transmitting jet thrust to the airplane. When the airplane reaches the desired launching speed the brake is applied and the catapult is stopped. Fuel supply to afterburner is shut off when the brake is applied. The jet engines may also be reduced in output or may be left at power, if quickly repeated launchings are to be made. The shuttle 47 is accelerated along the track or rail guide flanges 52 and 53 and the longitudinal grooved sides 47[a] and 47[b] of the shuttle 47, which ride along the guide flanges as it pulls the airplane for launching.

Shuttle retrieving operation

Retrieving of the shuttle 47 is accomplished by stopping the rotor 55 and its driving cable system by applying the friction brake. During the braking period the jet exhaust may be by-passed from the forward driving tail pipes 55 and 56 either to atmosphere outside the rotor or through the opposed reverse direction tail pipes 62 in the rotor.

Figure 5:
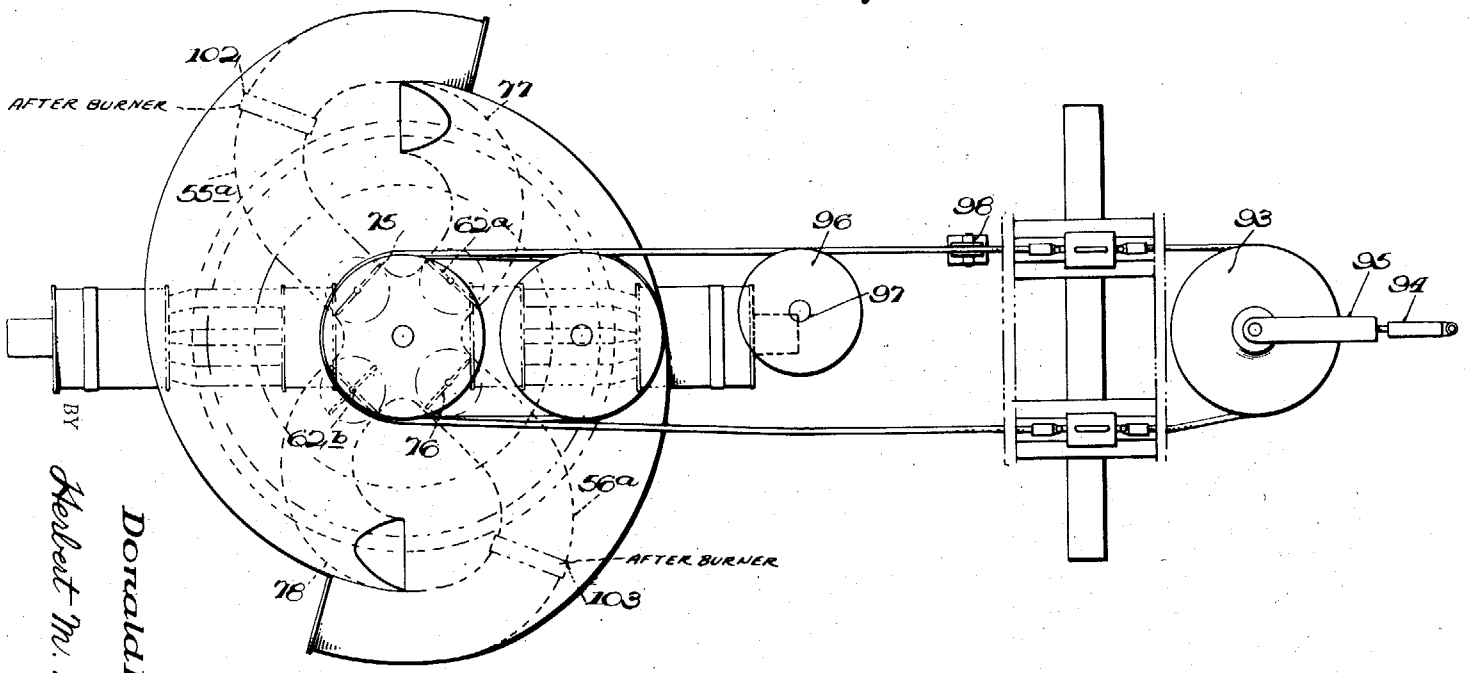
Figure 5 is a top plan view in elevation of the said second embodiment.
Figure 6:
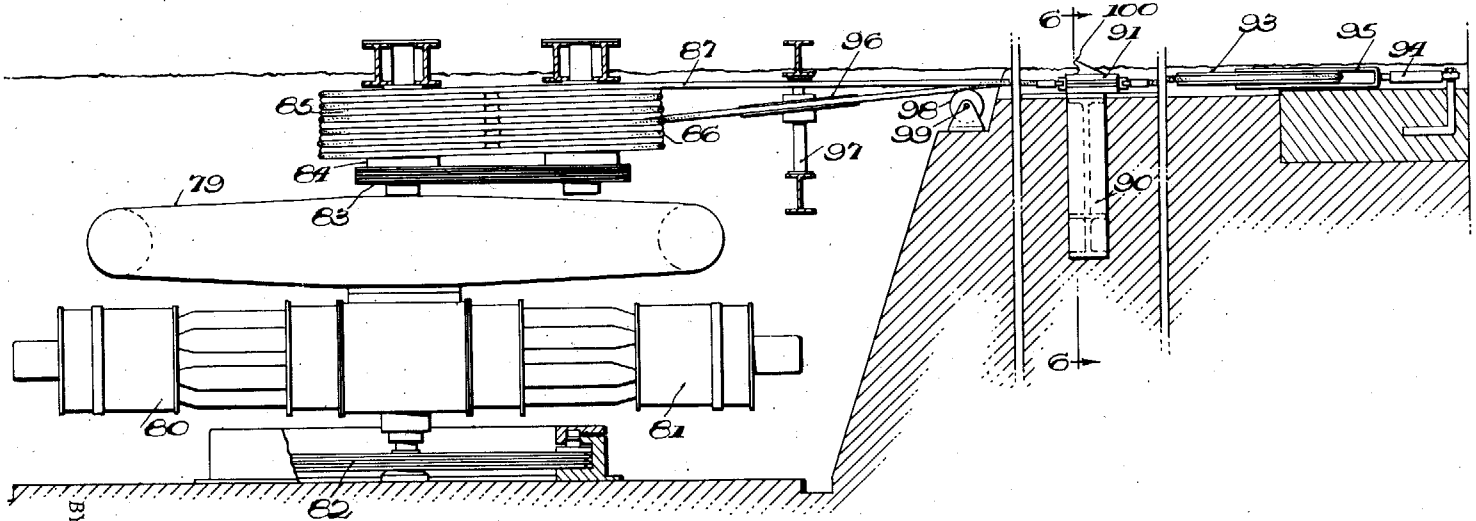
Figure 6 is a side elevational view of a third embodiment of the invention installed as a flush surface catapult and showing the driving sheaves, the rotor, the turbine-compressors and the brakes superimposed in different relation.
Figure 7:
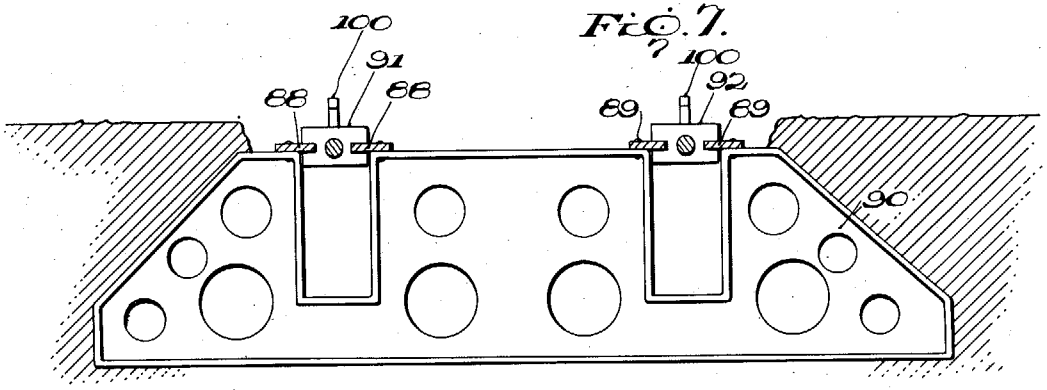
Figure 7 is a transverse cross section view taken on the section line 6—6 of Figure 6.

Valve arrangements for by-passing the exhaust jets from the forward tail pipes to the reversing tail pipes are shown schematically in a third embodiment of the invention (see Figures 5, 6 and 7). However, such valves are the same in all forms of the present invention. The control valves 75 and 76 are for the forward drive pipes 55[a] and 56[a] and the control valves 62[a] and 62[b] are for the reverse or retrieving drive tail pipes 77 and 78.

Embodiment number three differs from embodiment two only in the superimposed positions of the jet motors, the rotor and the cable drive arrangement. Otherwise they are the same in general structure and operation to the second embodiment. For example, embodiment three comprises a rotor 79, jet engines 80 and 81 and friction brake discs 82 for holding the rotor until thrust output has developed to the required value.

A sheave drive from the rotor drive shaft comprising a power take-off sheave 83 on the catapult cable sheave shaft 84 is connected to drive the tandem catapult cable sheaves 85 and 86. The catapult cable 87 winds out from the sheaves and extends and travels between spaced shuttle guide rails 88—88 and 89—89 on each side of a ground embedded rail tie 90. The shuttle 91 is guided by rails 88—88 and the shuttle 92 is guided by rails 89—89 and may be used to launch aircraft in either direction, that is, toward or from the terminal end sheave 93. The sheave 93 is fixed to a shock absorber 94 through yoke 95 and the catapult cable loops around the end sheave with one reach thereof being guided by follower pulley 96 mounted in vertical shaft 97 and an idler pulley 98 mounted on a horizontal axis 99. Each shuttle has the usual bridle hook 100 and rides back and forth along its respective guide rails whenever the jet rotor is released by the friction holding brake discs 82.

As shown in Figures 5, 6 and 7, the bridle hooks 100 are turned for bridle connection from the terminal end of the catapult, so as to launch on the retrieve drive of the rotor 79. However, these hooks are preferably turnably mounted on the shuttle body for catapulting in either direction.

In Figure 5 the afterburners are schematically indicated by numerals 102 and 103. It is of course understood that the retriever or reverse tail pipes 77 and 78 may likewise be provided with afterburners and as hereinbefore stated the operation is generally like that of form two, except that the double track and shuttle permits reciprocal launching.

Figure 8:
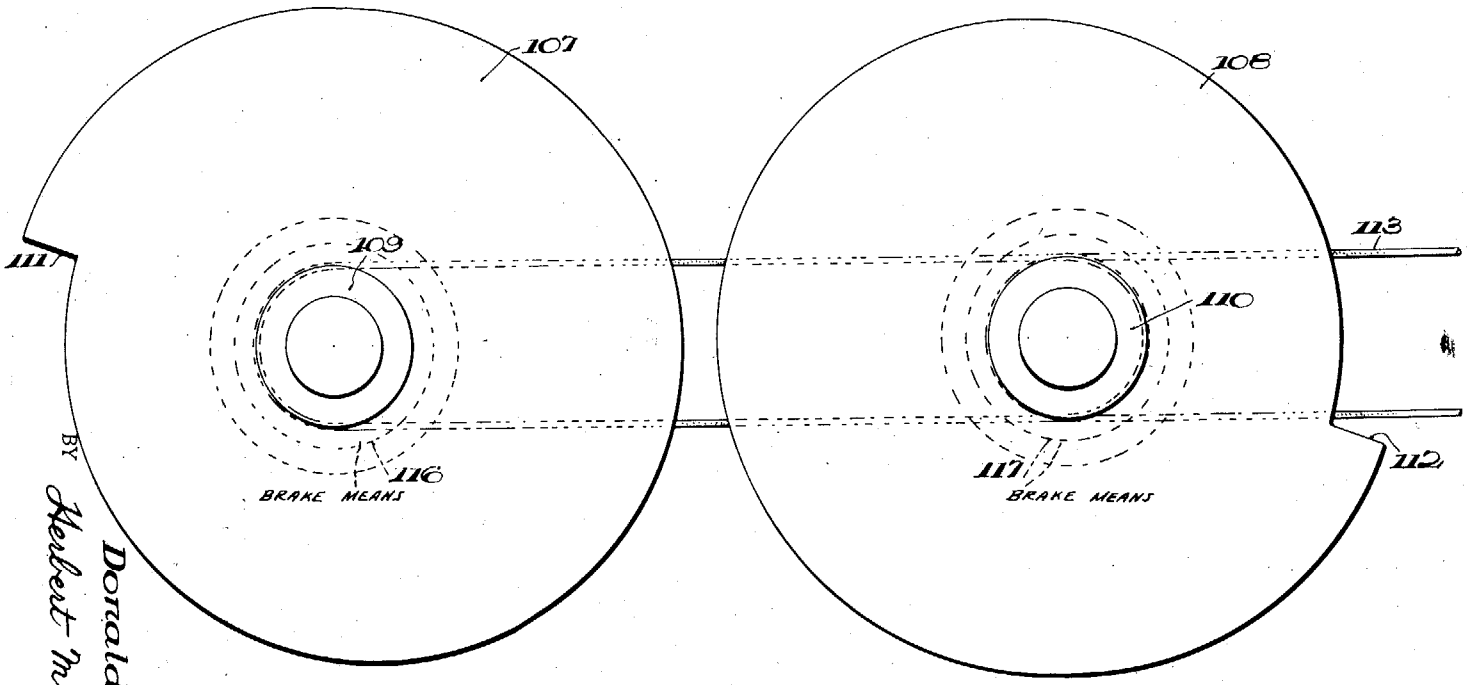
Figure 8 is a fourth embodiment of the invention in top plan showing a dual drive jet system adapted for reciprocal launching.
Figure 9:
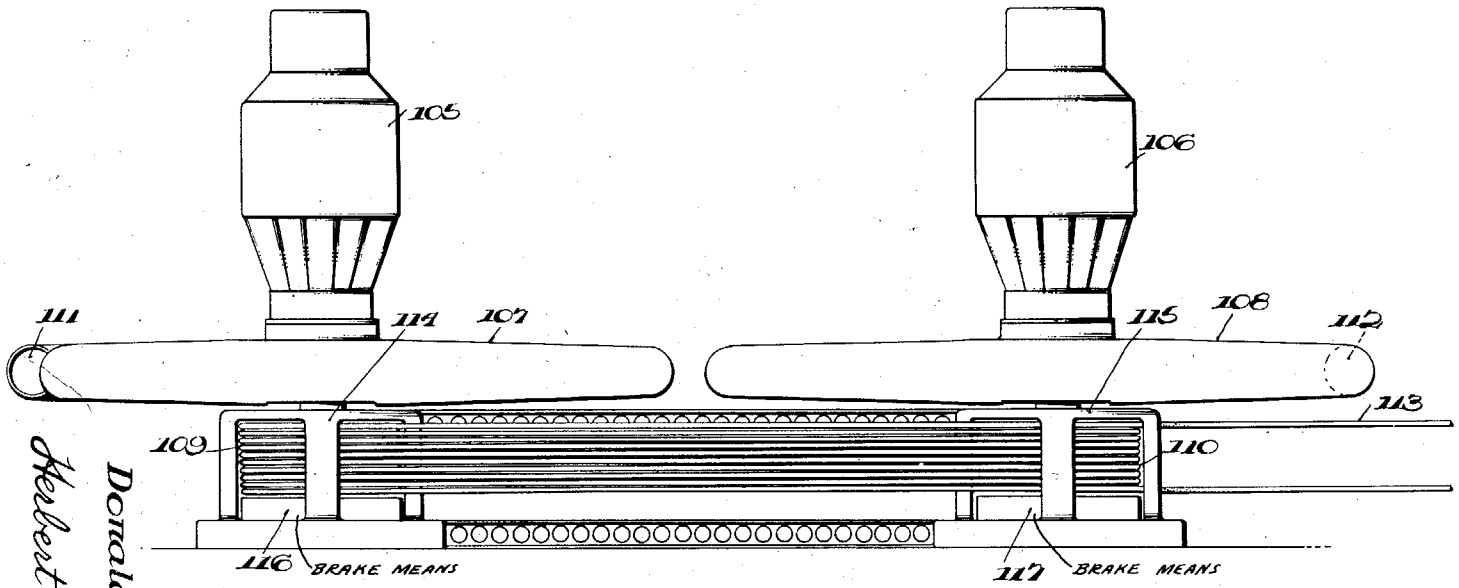
Figure 9 is a side elevational view of the reciprocal launching motors shown in Figure 8.

A fourth embodiment of the present invention is illustrated in Figures 8 and 9, wherein there is a dual rotor drive comprising at least a pair of jet motors 105 and 106 each exhausting into a separate rotor. For example, motor 105 exhausts into rotor 107 and motor 106 into rotor 108. Each rotor 107 and 108 drives a cable drive sheave 109 and 110, respectively, made of a plurality of individually stacked sheaves. One of the rotors has an exhaust nozzle 111 opening counter-clockwise for clockwise rotation, while the other rotor has an exhaust nozzle 112 for similar concerted rotation, to thereby drive the catapult launching cable 113. The usual shuttle and terminal end anchor shown in the preceding forms of invention may be used. The cable drive sheaves are housed in cages 114 and 115 along with their respective brake means 116 and 117.

Figures 10, 11, 12, 13:
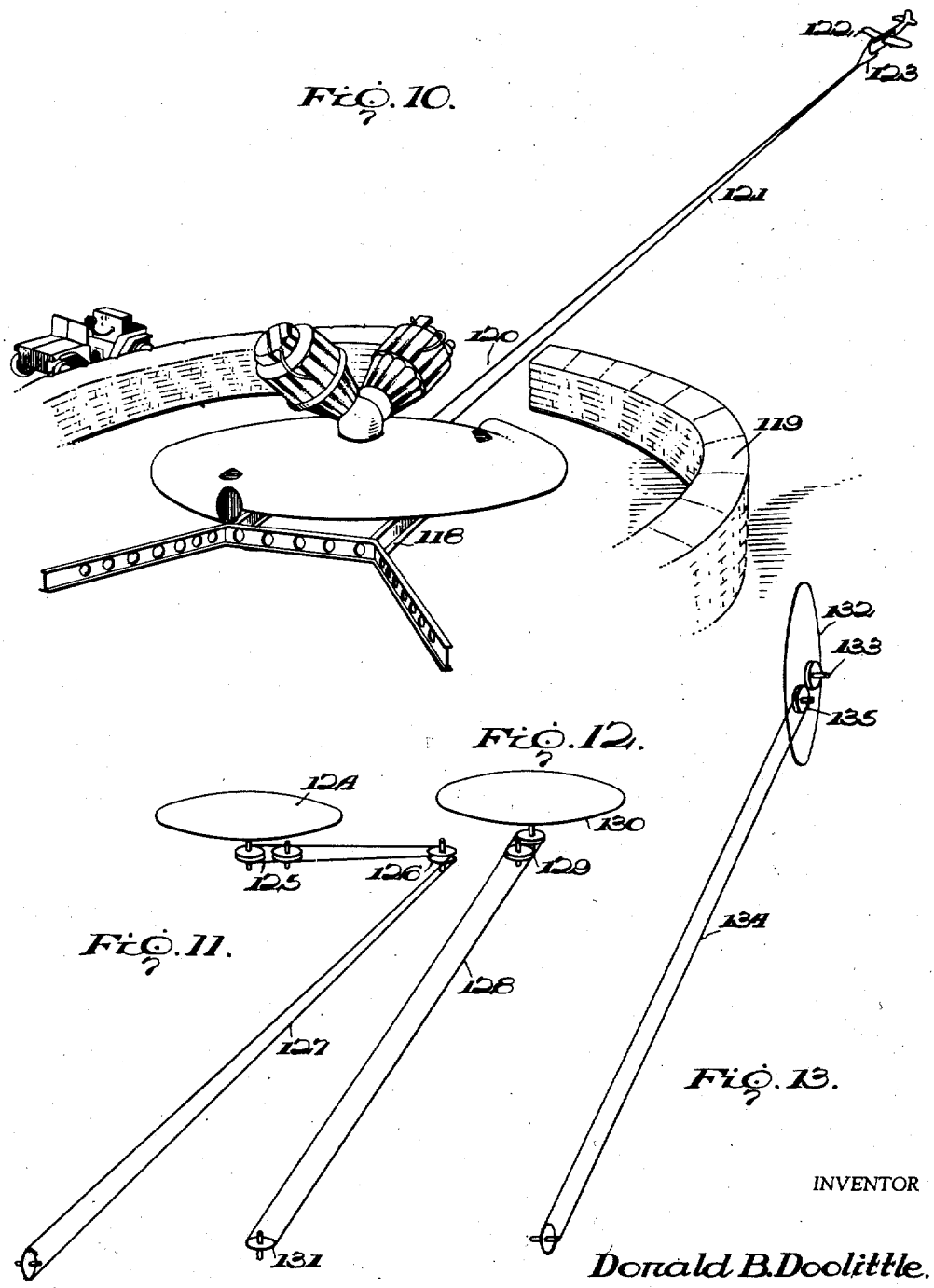
Figure 10 is a representation of a typical jet catapult installation.
Figure 11 is a fifth embodiment of the invention showing a rotor on a vertical spin axis with the catapult offset with respect thereto.
Figure 12 is a sixth embodiment of the invention showing the rotor on a vertical spin axis and the drive sheaves and the catapult in line.
Figure 13 is still a seventh embodiment with the rotor on a horizontal spin axis and the drive sheaves and catapult in line.

Figure 10 is an illustration of an expeditionary catapult installation, it being mounted so as to be readily set up and demounted for transportation to various locations. It comprises the jet motors exhausting into a rotor like form 1, but is more simply mounted on large beams 118. Also, a protecting sand bag wall 119 may surround the installation and is formed with an opening 120 for the cable 121, which is connected to the aircraft 122 by bridle 123.

Any installation like that of Figures 1 and 10 may be provided with either of the drives shown in Figures 11, 12 or 13. For example, in Figure 11 there is a schematic drawing of a vertical spin axis jet rotor 124, a sheave drive 125 and idler pulleys 126 to provide an offset catapult cable 127. Figures 12 shows a catapult cable 128 in line with the sheave drive 129 from the rotor 130 and terminal end sheave 131; and Figure 13 shows a rotor 132 on a horizontal spin axis 133 with an in line catapult 134 and drive 135 therefor.

Figure 14:
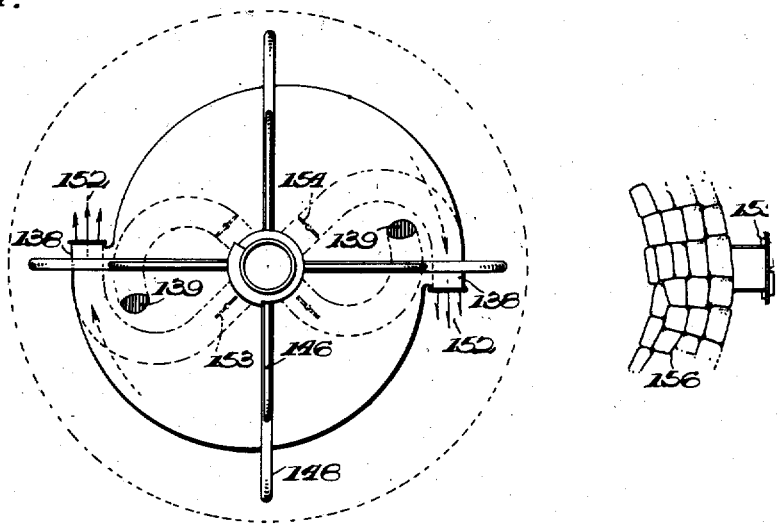
Figure 14 is a top plan view of an eighth embodiment of the invention using a single turbine-compressor unit for exhausting into a vertical spin axis rotor.
Figure 15:
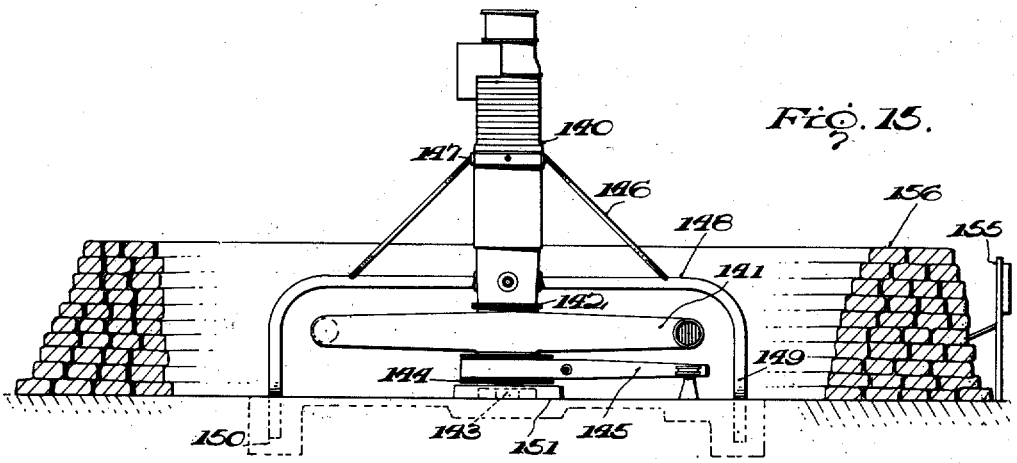
Figure 15 is a side elevational view of Figure 14, including a Prony brake dynamometer control for the rotor.

Next referring to Figures 14 and 15 there is illustrated a single jet motor 140 exhausting into a rotor 141 having concentrically arranged pairs of reversely curved jet exhaust nozzles 138—138 and 139—139 for revolving the rotor with a bearing sleeve 142 around a vertical axis spin shaft 143. Secured to the sleeve 142 is a brake drum 144 comprising a part of a Prony brake dynamometer control for the rotor, which includes a balanced lever 145 serving to measure the degree of pull on the friction drum 144 as the thrust output of the rotor builds up to catapulting efficiency. The lever 145 may be weight or spring balanced, the primary purpose being to provide an indication as to when the brake release should be made to permit rotor operation at catapulting efficiency.

This rotor may be connected to drive any device, such as a large blower, not shown, for wind tunnel testing or for providing a source of power for many desired uses. The lower part of the jet motor is braced by rods 146 from a collar 147 to a tubular support 148 curved to form anchoring legs 149 secured in a ground base plate 150. This base plate is formed with a center shaft or bearing support portion 151.

Curving radially into a tangential relation with respect to the peripheral circumference of the rotor 141 are the jet exhaust nozzles 138—138, which are opened to exhaust in the direction of the arrows 152, see Figure 14. The jets are controlled by flow control valves 153 and 154 from a remote control station 155 outside the protecting wall, such as the sand bag protecting barrier 156. The necessary control levers leading to the valves are not shown, but they are typically bell-crank and link connections.

The curves of the jet exhaust nozzles 139—139 are concentrically within the tangential curves of the outer nozzles 138—138 to make a compact unit and open to exhaust to the atmosphere in reverse directions to the outer nozzles and tangentially to the circumference of the rotor 141. For example, in Figure 1, the rotor 10 of this figure shows the reverse exhaust openings provided in the rotor for these exhaust nozzles 139—139. The only difference between rotor 10 of Figure 1 and rotor 141 of Figures 14 and 15 resides in the use of one jet engine instead of two and in the support structure.

Figure 16:
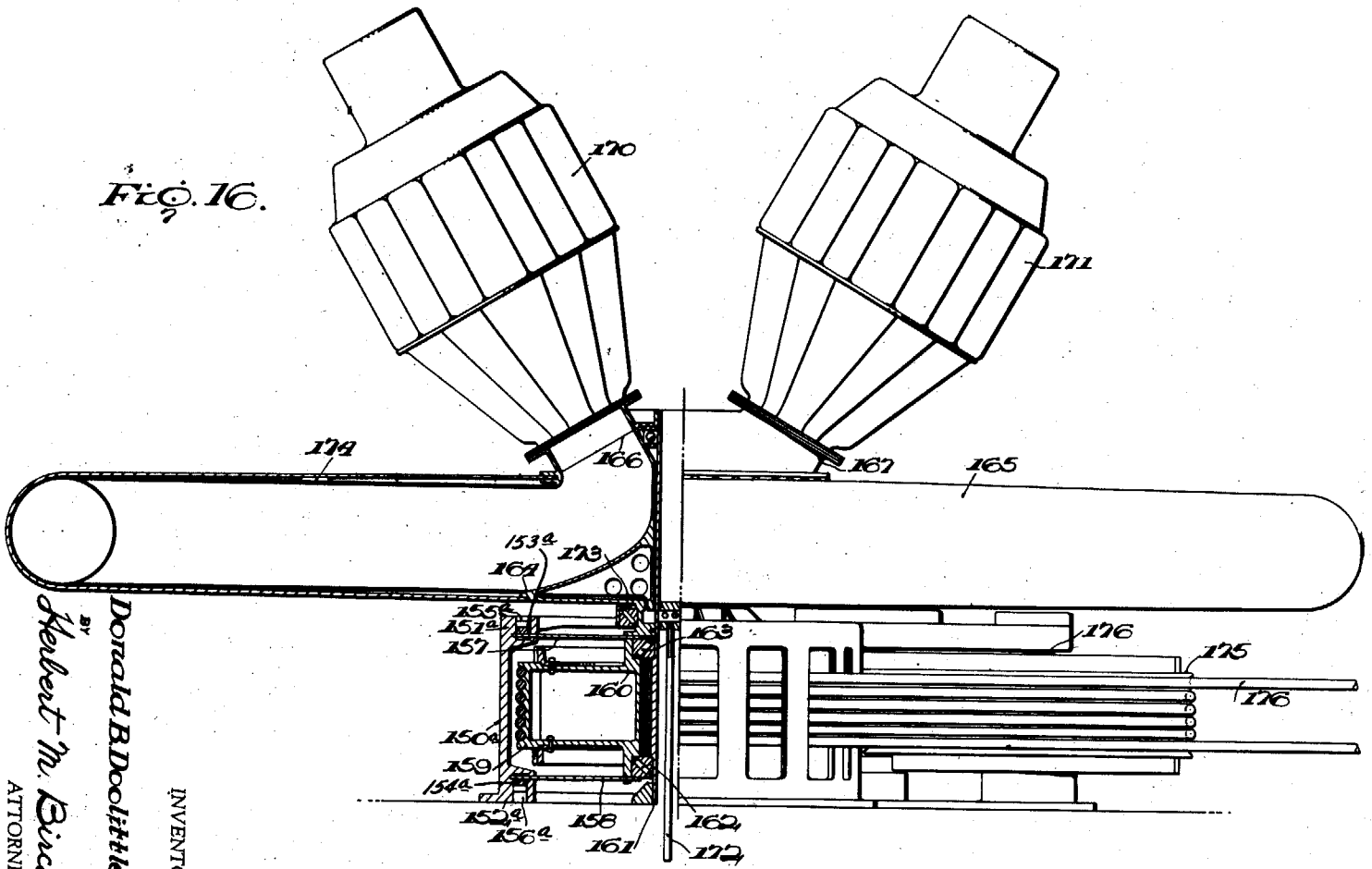
Figure 16 is a side cross section view of a ninth embodiment showing the arrangement of the rotor, the drive sheaves, the turbine-compressors exhaust into the rotor and the after-burner fuel line, such embodiment being usable for expeditionary installations.

Another and final embodiment is illustrated in Figure 16. This embodiment shows a skeleton brake support 150a recessed at the top and bottom by enlarged solid peripheral rims 151a and 152, respectively. These recesses in the rims form housings for upper and lower brake shoes 153a and 154a, respectively, which brake shoes are mounted on flexible brake discs 157 and 158 and may be actuated by fluid pressure supplied by conduits, not shown, through the sealing blocks 155a and 156a of each respective brake housing. The brake discs 157 and 158 are secured to the upper and lower hub ends of a cable drum 159 and rotatable therewith when the brakes are released for catapult operation.

The drum hub 160 is journalled to rotate around a fixed vertical spin axis shaft 161 by bearings 162 and 163 and the upper portion of the hub 160 extends and is formed into the fixed hollow head or dome 164 of a jet propelled rotor 165. The hollow dome or head 164 is secured to the upper end of shaft 161 and is formed with flanged jet motor exhaust openings 166 and 167. The flanges around these openings support the flanged exhaust bases 168 and 169 of jet motors 170 and 171, respectively. The jet motors are of any suitable known type and the rotor 165 is formed with jet exhaust nozzles similar to the preceding described embodiment jet nozzles, particularly those wherein an afterburner is used. As shown there is an afterburner fuel line 172 leading to a fuel distributor block, which has lead-off fuel conduits, such as 173 to an afterburner 174 in each exhaust nozzle and permits relative rotation of the fuel lead-off conduits from the block. The afterburners are only shown diagrammatically, their details being well known to others skilled in the jet motor art.

The cable drive drum 159 is in spaced parallel relation to a second drum or sheave 175 mounted to turn on vertical shaft 176 and when drum 159 rotates the friction of the multistrands of cable 176 on drum 175 causes the same to rotate as part of the friction sheave drive for the catapult or other mechanism being driven.

There are many advantages in favor of the jet engine for catapult operation. First, for example, there is the flexibility of the capacity of the catapult. For instance, if a requirement to catapult an airplane twice the kinetic energy should occur, it is a simple matter to increase the run-out by adding additional track and cable using the same maximum thrust. Second, the light weight, reliability and standard fuel used makes this basic catapult design adaptable to aircraft carrier use. For example, the catapult power plant may be located in the lower part of the ship with sufficient ventilation and a shaft extending from below to the deck for mounting the sheave assembly. A third advantage is provided by cutting off the fuel or by operating the valve which allows gas to pass to the jet engine turbine, thus quickly stopping the catapult operation. This quick stopping and control feature is important in the event of overspeeding caused by a runaway shot, such as a broken bridle, etc. Also, the catapult may be stopped by automatic means, not shown, if, at a predetermined run-out of approximately fifty feet, the airplane has not reached a safe speed for catapult. Fourth, the catapult load is very flexible and may be selected over a wide range by merely setting the controls to the engines. Because of the wide range of variation in the thrust of the jet engine, such a catapult arrangement may catapult an airplane as light as five thousand pounds or as heavy as forty thousand pounds by reading and checking the thrust developed by the jet engines prior to each brake release for airplane catapulting. Thus with such an arrangement the thrust during the catapult operation is not a function of a slipping clutch or the like. Still another advantage is the provision of equipment sufficiently light in weight for aircraft transportation as all structures will be kept within a known aircraft weight standard throughout.

Without further description, it is believed that the several embodiments and their many advantages over the prior art are described and illustrated so as to be clearly understandable and it is to be expressly understood that other arrangements, parts and combinations of parts which will now occur to others are also to be considered within the scope of the present invention. To determine the scope of the invention, reference should be had to the appended claims.

What is claimed is:

1. A jet engine power plant comprising a fixed hollow dome formed with at least one opening, a turned over flange around the perimeter of the opening, a jet engine having a hollow flanged exhaust, said engine exhaust flange being equal in area to said first mentioned flange and being secured to the same, a rotor having a hollow hub rotatably mounted to revolve around said hollow dome, said hub being adapted to receive the exhaust from said jet engine through said dome, and a plurality of rotor supported tailpipes having their terminal exhaust ends so shaped and so proportioned as to form exhaust nozzles, open tangentially of the rotor's circumference adapted to pick up the jet engine exhaust from the said hub and impart tangential thrust to the rotor.

2. A jet engine power plant comprising a fixed hollow dome formed with at least one opening, a turned over flange around the perimeter of the opening, a jet engine having a hollow flanged exhaust, said engine exhaust flange being equal in area to said first mentioned flange and being secured to the same, a rotor having a hollow hub rotatably mounted to revolve around said hollow dome, said hub being adapted to receive the exhaust from said jet engine through said dome, and a plurality of rotor supported tailpipes having their terminal exhaust ends so shaped and so proportioned as to form exhaust nozzles, open tangentially of the rotor's circumference adapted to pick up the jet engine exhaust from the said hub and impart tangential thrust to the rotor, and afterburner means mounted in the said tailpipes ahead of each of their respective exhaust nozzles to increase the tangential thrust of the rotor.

3. A jet engine power plant comprising a fixed hollow dome formed with at least one opening, a turned over flange around the perimeter of the opening, a jet engine having a hollow flanged exhaust, said engine exhaust flange being equal in area to said first mentioned flange and being secured to the same, a rotor having a hollow hub rotatably mounted to revolve around said hollow dome, said hub being adapted to receive the exhaust from said jet engine through said dome, and a plurality of rotor supported tailpipes having their terminal exhaust ends so shaped and so proportioned as to form exhaust nozzles, open tangentially of the rotor's circumference adapted to pick up the jet engine exhaust from the said hub and impart tangential thrust to the rotor, and brake means for holding said rotor against rotation, until the thrust output of the rotor reaches a predetermined value.

4. A jet engine power plant comprising a fixed hollow dome formed with at least one opening, a turned over flange around the perimeter of the opening, a jet engine having a hollow flanged exhaust, said engine exhaust flange being equal in area to said first mentioned flange and being secured to the same, a rotor having a hollow hub rotatably mounted to revolve around said hollow dome, said hub being adapted to receive the exhaust from said jet engine through said dome, and a plurality of rotor supported tailpipes having their terminal exhaust ends so shaped and so proportioned as to form exhaust nozzles, open tangentially of the rotor's circumference adapted to pick up the jet engine exhaust from the said hub and impart tangential thrust to the rotor, some of said exhaust nozzles opening tangentially in an opposite direction to others and control valves for selectively controlling the flow of the jet engine exhaust from said nozzles to thereby cause rotation of said rotor in either a forward or a reverse direction, and friction brake means including a drum carried by the rotor adapted to hold the rotor from rotation *if* [is] desired.

5. A jet engine power plant comprising a fixed hollow dome formed with at least one opening, a turned over flange around the perimeter of the opening, a jet engine having a hollow flanged exhaust, said engine exhaust flange being equal in area to said first mentioned flange and being secured to the same, a rotor having a hollow hub rotatably mounted to revolve around said hollow dome, said hub being adapted to receive the exhaust from said jet engine through said dome, and a plurality of rotor supported tail pipes having their terminal exhaust ends so shaped and so proportioned as to form exhaust nozzles open tangentially of the rotor's circumference adapted to pick up the jet engine exhaust from the said hub and impart tangential thrust to the rotor, some of said exhaust nozzles opening tangentially in an opposite direction to others and control valves for selectively controlling the flow of the jet engine exhaust from said nozzles to thereby cause rotation of said rotor in either a forward or a reverse direction, and friction brake means including a drum carried by the rotor adapted to hold the rotor from rotation if desired, said drum having an exterior circumference adapted to function as a power drive for a cable.

6. A jet engine power plant comprising a fixed hollow dome formed with at least one opening, a turned over flange around the perimeter of the opening, a jet engine having a hollow flanged exhaust, said engine exhaust flange being equal in area to said first mentioned flange and being secured to the same, a rotor having a hollow hub rotatably mounted to revolve around said hollow dome, said hub being adapted to receive the exhaust from said jet engine through said dome, and a plurality of rotor supported tail pipes having their terminal exhaust ends so shaped and so proportioned as to form exhaust nozzles open tangentially of the rotor's circumference adapted to pick up the jet engine exhaust from the said hub and impart tangential thrust to the rotor, some of said exhaust nozzles opening tangentially in an opposite direction to others and control valves for selectively controlling the flow of the jet engine exhaust from said nozzles to thereby cause rotation of said rotor in either a forward or a reverse direction, and friction brake means including a drum carried by the rotor adapted to hold the rotor from rotation if desired, said drum having an exterior circumference adapted to function as a power drive for a cable, said cable being an endless cable, a shuttle connected to one reach of the cable, and a bridle hook on the shuttle adapted to connect to the bridle of an aircraft to propel and assist in launching the same.

7. An aircraft launching system comprising a jet propelled rotor with a hollow hub portion, a member secured to said rotor hub to be rotatable with said rotor, said rotor having jet tail pipes curved tangentially with respect to the rotor's circumference in both a clockwise and a counter-clockwise direction, a driving drum secured to said member, an endless launching cable looped around said drum to be driven thereby, the terminal loop end of the said cable being looped around an anchoring idler pulley, a tension cylinder means connected to the axle of said idler pulley at one end and to a fixed support at the other end, spaced guide rails along each side of at least one reach of the said cable, a launching shuttle connected in the said one reach of cable having connecting means for the bridle of an aircraft to be launched, jet motors mounted adjacent the said rotor to thereby exhaust into the said hollow rotor hub and the said jet tail pipes, brake means operatively associated with the cable driving drum, said brake means being releasable when the jet motor exhaust has developed to a thrust value within the rotor sufficient to drive the launching cable, shuttle and a bridle connected aircraft toward the launching end of the guide rails at aircraft launching speed in the direction of said idler pulley, and control vanes for selectively opening or closing either the clockwise rotor rotation directing tail pipes or the counter-clockwise rotor rotation directing tail pipes.

8. An aircraft launching system comprising a jet propelled rotor with a hollow hub portion, a member secured to said rotor hub to be rotatable with said rotor, said rotor having jet tail pipes curved tangentially with respect to the rotor's circumference in both a clockwise and a counter-clockwise direction, a driving drum secured to said member, an endless launching cable looped around said drum to be driven thereby, the terminal loop end of the said cable being looped around an anchoring idler pulley, a tensioning means connected to the axle of said idler pulley at one end and to a fixed support at the other end, spaced guide rails along each side of at least one reach of the said cable, a launching shuttle connected in the said one reach of cable having connecting means for the bridle of an aircraft to be launched, jet motors mounted adjacent the said rotor to thereby exhaust into the said hollow rotor hub and the said jet tail pipes, brake means operatively associated with the cable driving drum, said brake means being releasable when the jet motor exhaust has developed to a thrust value within the rotor sufficient to drive the launching cable, shuttle and a bridle connected aircraft toward the launching end of the guide rails at aircraft launching speed in the direction of said idler pulley, said brake serving to stop the moving parts after each launching prior to retrieving the launching shuttle, and control means for reversing the rotor after release of the brake to thereby reverse the aircraft launching direction of said shuttle so as to retrieve the shuttle for the next launching operation.

9. A jet engine power plant comprising a pair of spaced apart fixed shafts, a pair of spaced apart hollow rotors journalled to rotate on said shafts, a hollow dome with an exhaust intake opening fixed to an end of each of said shafts, a jet engine mounted on each dome to thereby exhaust into said dome opening, open ended tailpipes carried by each rotor and radiating from the center of their respective rotors receiving the exhaust from the dome, said tailpipes being curved into tangentially positioned nozzles with respect to the circumference of their respective rotors, the nozzles of one rotor opening into a clockwise direction and the nozzles of the other rotor in a counter-clockwise direction, a cable drive sheave rotatable with each of said rotors, and brake means for holding either or both of said rotors fixed, said brakes when released alternately serving to drive their said respective sheaves, one of which rotates clockwise and the other of which rotates counter-clockwise to regulate the direction of travel of an endless cable around the said sheaves.

10. A jet power system comprising a hollow rotor casing having a hub mounted to revolve around a hollow dome, said dome being fixed upon the upper end of a vertical shaft, a rotatable bearing sleeve secured to the rotor hub and rotatable therewith, jet engines mounted on the said dome and exhausting into the rotor hub, a plurality of jet exhaust tailpipes radiating diametrically from the hub and dome toward the circumference of the rotor, said tailpipes being curved into jet exhaust nozzles tangentially with respect to the circumference of the rotor casing, some of said nozzles curving clockwise of the rotor and some of said nozzles curving counter-clockwise of the rotor and being concentrically positioned within the curve of said clockwise curving nozzles, afterburners mounted in each of the curved nozzles adapted when operated to increase the output thrust of each nozzle when opened to the jet exhaust from said jet engines, and control means for closing said counter-clockwise curved nozzles to the jet exhaust while said clockwise curved nozzles are open to the jet exhaust.

11. A jet power system comprising a hollow rotor casing having a hub mounted to revolve around a hollow dome, said dome being fixed upon the upper end of a vertical shaft, a rotatable bearing sleeve secured to the rotor hub and rotatable therewith, jet engines mounted on the said dome and exhausting into the rotor hub, a plurality of jet exhaust tailpipes radiating diametrically from the hub and dome toward the circumference of the rotor, said tailpipes being curved into jet exhaust nozzles tangentially with respect to the circumference of the rotor casing, some of said nozzles curving clockwise of the rotor and some of said nozzles curving counter-clockwise of the rotor and being concentrically positioned within the curve of said clockwise curving nozzles, afterburners mounted in each of the curved nozzles adapted when operated to increase the output thrust of each nozzle when opened to the jet exhaust from said curved nozzles to the jet exhaust while said clockwise curved nozzles are open to the jet exhaust, and brake means adapted to start and stop the rotor, said rotor carrying a brake surface engageable by a brake shoe carried by the fixed vertical shaft.

12. A jet power system comprising a hollow rotor casing having a hub mounted to revolve around a hollow dome, said dome being fixed upon the upper end of a vertical shaft, a rotatable bearing sleeve secured to the rotor hub and rotatable therewith, jet engines mounted on the said dome and exhausting into the rotor hub, a plurality of jet exhaust tailpipes radiating diametrically from the hub and dome toward the circumference of the motor, said tailpipes being curved into jet exhaust nozzles tangentially with respect to the circumference of the rotor casing, some of said nozzles curving clockwise of the rotor and some of said nozzles curving counter-clockwise of the rotor and being concentrically positioned within the curve of said clockwise curving nozzles, afterburners mounted in each of the curved nozzles adapted when operated to increase the output thrust of each nozzle when opened to the jet exhaust from said jet engines, a control means for closing said counter-clockwise curved nozzles to the jet exhaust while said clockwise curved nozzles are open to the jet exhaust, a drum secured to said bearing sleeve below the rotor and encircling the said vertical shaft, a gear train driven when said sleeve and drum are rotated, a vertical screw shaft exterior of the drum, said drum having friction brake surfaces interior thereof and friction brake shoes engageable therewith, a follower pulley having a centrally threaded hub adapted to travel along the screw shaft, an endless cable looped around the drum in spiral convolutions and over said follower pulley, said cable winding continuously from the drum and being guided up and down by said [following] *follower* pulley, said pulley being driven vertically of the drum by the gear train, whereby the reach of the cable travels in a plane above the other, said upper travelling reach of the cable driving a launching shuttle forward away from the jet power system when the brakes of the rotor driven drum are released permitting said rotor to revolve in a clockwise direction, said upper reach thereby being reversible to retrieve said launching shuttle when said control means are actuated to close said clockwise curved nozzles and said counter-clockwise curved nozzles are opened.

13. A jet engine power plant comprising a fixed hollow dome formed with at least one opening, a turned over flange around the perimeter of the opening, a jet engine having a hollow flanged exhaust, said engine exhaust flange being equal in area to said first mentioned flange and being secured to the same, a rotor having a hollow hub rotatably mounted to revolve around said hollow dome, said hub being adapted to receive the exhaust from said jet engine through said dome, and a plurality of rotor supported tailpipes having their terminal exhaust ends so shaped and so proportioned as to form exhaust nozzles, open tangentially of the rotor's circumference adapted to pick up the jet engine exhaust from the said hub and impart tangential thrust to the rotor, and brake means for holding said rotor against rotation, until the thrust output of the rotor reaches a predetermined value, said brake being a friction brake and responsive to the degree of pull on the friction brake as the thrust output of the rotor builds up to power take-off efficiency.

14. A jet powered rotor rotatably mounted below a hollow dome supporting one or more jet motor means, said rotor comprising a central hollow hub open to the exhaust from said motor means, an S-shaped tail pipe divided centrally into exhaust sections by said hub and thereby in communication with said exhaust, said exhaust ends of said tail pipe exhaust sections opening tangentially of the rotor circumference to the atmosphere, and afterburners in the exhaust ends of each exhaust section to increase the thrust output of the tail pipe exhaust.

15. A jet powered rotor rotatably mounted below a hollow dome supporting one or more jet motor means, said rotor comprising a central hollow hub open to the exhaust from said motor means, an S-shaped tail pipe divided centrally into exhaust sections by said hub and thereby in communication with said exhaust, said exhaust ends of said tail pipe exhaust sections opening tangentially of the rotor circumference to the atmosphere, afterburners in the exhaust ends of each exhaust section to increase the thrust output of the tail pipe exhaust, a brake drum carried by the rotor, a brake shoe around the said drum, and means for applying said shoe to the drum to stop the rotor.

16. Means for the reciprocal launching of aircraft comprising an endless launching cable, said cable being looped around driving sheaves at one end and an idler sheave at the other end, tensioning means for said cable, an aircraft launching shuttle in each reach of said endless cable, reversible driving means connected to said driving sheaves, whereby one shuttle is moved toward said idler sheave approximately the distance of said first cable reach, while said other shuttle is moved in the opposite direction away from said idler sheave approximately the distance of said second cable reach, and control means for said driving means adapted to reverse the rotation of said driving sheaves and the direction of travel of said cable thereby providing a continuous reciprocal launching position for each launching shuttle, said reversible driving means being a jet power plant comprising a jet motor powered rotor, said rotor having reversely directed reaction jet exhaust nozzles and wherein said control means comprises valve members for alternately closing the nozzles directed in first one direction for one reciprocal launching direction and through the nozzles directed in the second opposite reciprocal launching direction for another reciprocal launching.

*17. A jet engine power plant comprising a hollow mounting formed with at least one opening, a jet engine having an end with an exhaust opening, said opening in the exhaust end of the engine being coupled to said mounting over the said mounting opening, a rotor rotatably mounted to revolve around said mounting, said rotor being positioned so as to receive exhaust from said engine through the exhaust opening and hollow mounting, and a plurality of rotor supported exhaust pipes carried by the rotor adapted to pick up the jet engine exhaust directed into the said rotor and impart rotation thereto.*

*18. Means for launching aircraft comprising a driven launching cable, said cable being looped around surface mounted sheaves, an aircraft shuttle connected to said cable, means to connect said aircraft shuttle with an aircraft connecting bridle, a drum for said cable, a turbine operatively connected to said drum adapted to rotate the drum, and jet engine means mounted adjacent said turbine, said jet engine means having jet exhaust ducts mounted to exhaust into the turbine, to thereby rotate said turbine and said cable drum to drive the launching cable and the shuttle conected thereto, said exhaust ducts being divided into branch ducts, said branch ducts extending to diametrically opposite peripheral sides of said turbine, and valve means in each branch duct adapted to selectively and alternately control the exhaust from said branch ducts to either peripheral side of the turbine to drive the same in either a clockwise or counter-clockwise direction.*

*19. Means for launching aircraft comprising a driven launching cable, said cable being looped around surface mounted sheaves, a shuttle connected to said cable, means to connect said shuttle with an aircraft bridle, a drum for said cable, a turbine operatively connected to said drum adapted to rotate the drum, said turbine having a casing with openings, jet engine means having exhaust ducts and said engine means being mounted over the openings in the said turbine casing to exhaust into the turbine, whereby the exhaust from said jet engine means rotates said turbine and said cable drum to drive the launching cable and the shuttle connected thereto, and exhaust control means in the exhaust ducts.*

References Cited in the file of this patent or the original patent

UNITED STATES PATENTS

| | | |
|---|---|---|
| 1,532,630 | Methlin | Apr. 7, 1925 |
| 1,777,167 | Forbes | Sept. 30, 1930 |
| 2,162,956 | Lysholm | June 20, 1939 |
| 2,523,314 | Maxson et al. | Sept. 26, 1950 |

FOREIGN PATENTS

| | | |
|---|---|---|
| 949,325 | France | Feb. 14, 1949 |